United States Patent [19]
Wiczer

[11] 3,782,749
[45] Jan. 1, 1974

[54] JOINT SIDE WHEEL AND REAR LEG CONTROL MEANS FOR HAND-PROPELLED CARTS

[76] Inventor: Max Wiczer, 6400 W. Gross Pointe, Niles, Ill. 60648

[22] Filed: Dec. 17, 1971

[21] Appl. No.: 209,155

Related U.S. Application Data

[63] Continuation-in-part of Ser. No. 68,721, Sept. 1, 1970, Pat. No. 3,687,425.

[52] U.S. Cl. ............................ 280/36 C, 280/150.5
[51] Int. Cl. ............................................ B62b 11/00
[58] Field of Search ..................... 280/150.5, 47.17; 296/20

[56] References Cited
UNITED STATES PATENTS

| | | |
|---|---|---|
| 3,223,429 | 12/1965 | Hastings ............................ 280/36 C |
| 2,877,047 | 3/1959 | Weil .................................. 280/41 R |
| 2,877,048 | 3/1959 | Weil .................................. 280/41 R |

*Primary Examiner*—Robert R. Song
*Attorney*—William E. Anderson et al.

[57] ABSTRACT

A hand-propelled cart with side wheels and a rear caster leg both foldable under the frame of the cart. The side wheels are foldable by means of a winch crank, and the caster leg by means of a hand lever, these controls both positioned in the rear of the cart. A hand knob in that region is depressible to allow the wheels to drop back to normal position; and a mechanism is provided to automatically release the caster leg in such event to drop back to standing position. The cart also carries a frontal control which, by engaging a vehicular support in front of the cart, causes the caster leg to fold.

7 Claims, 23 Drawing Figures

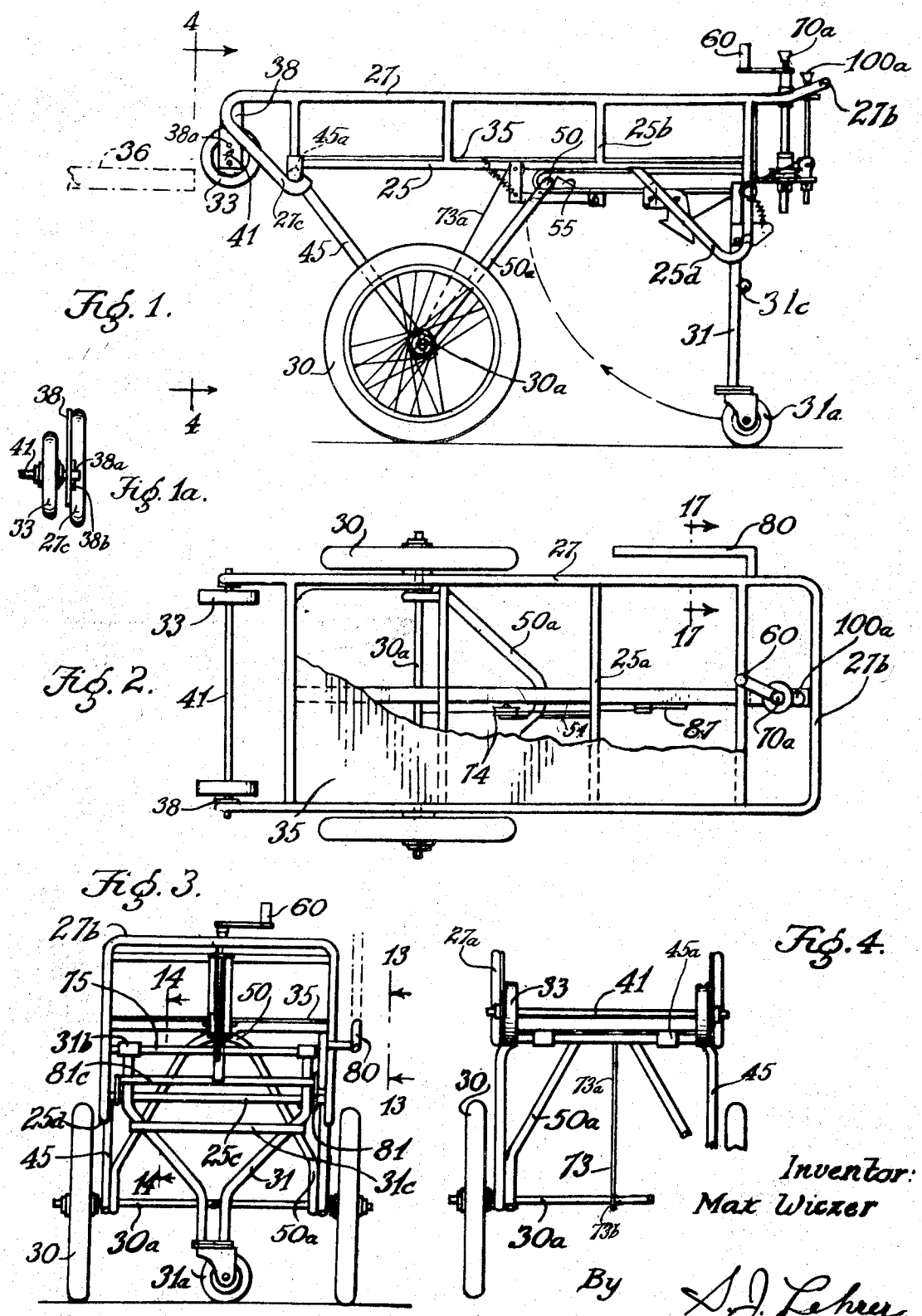

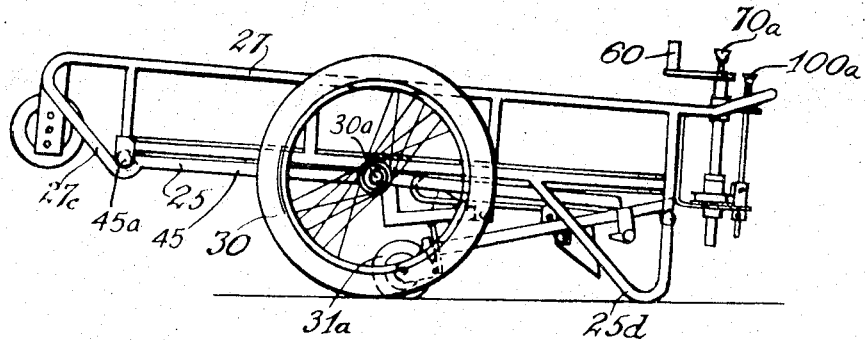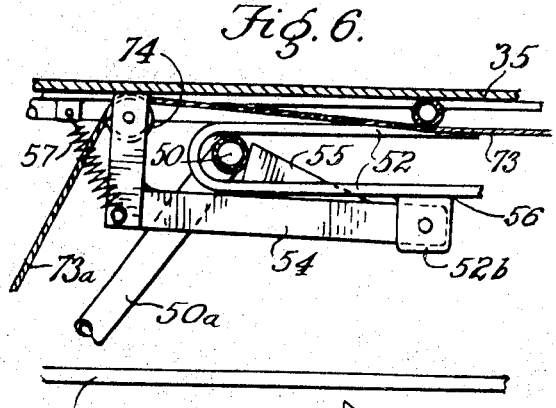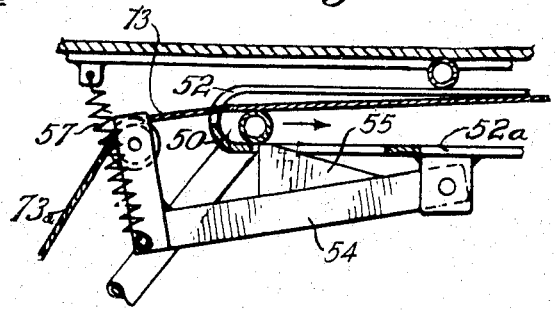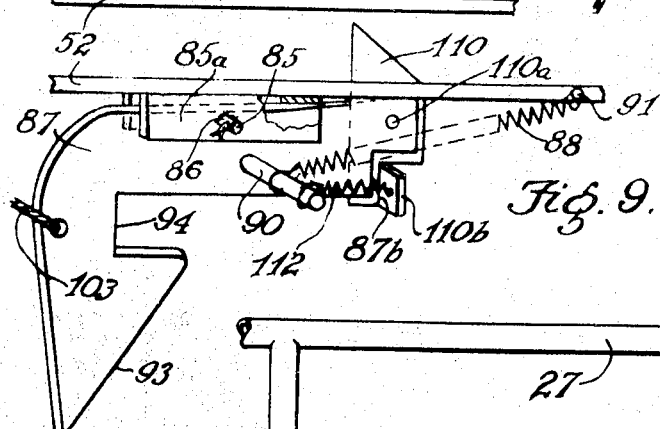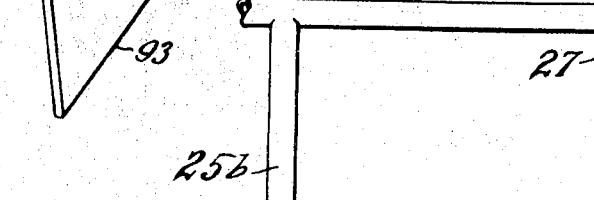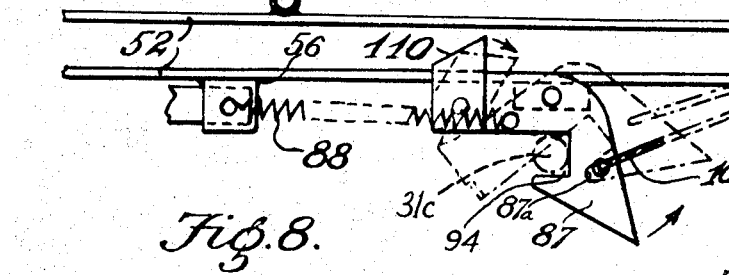

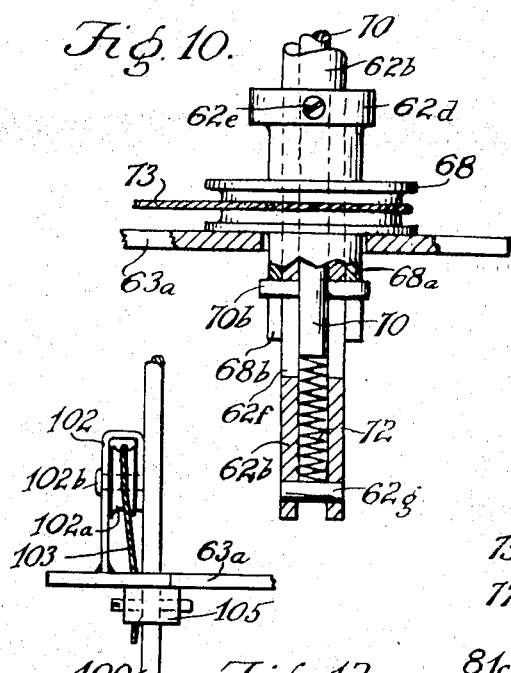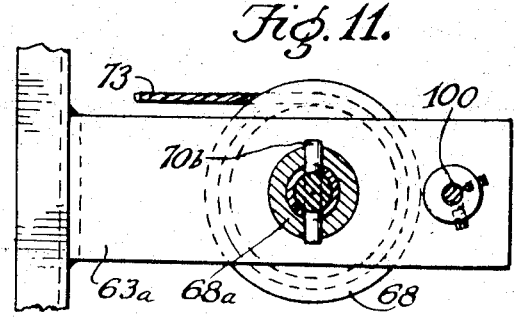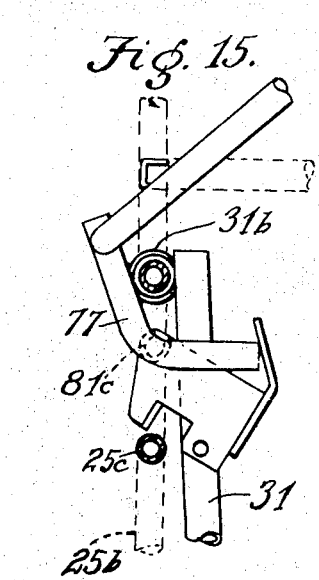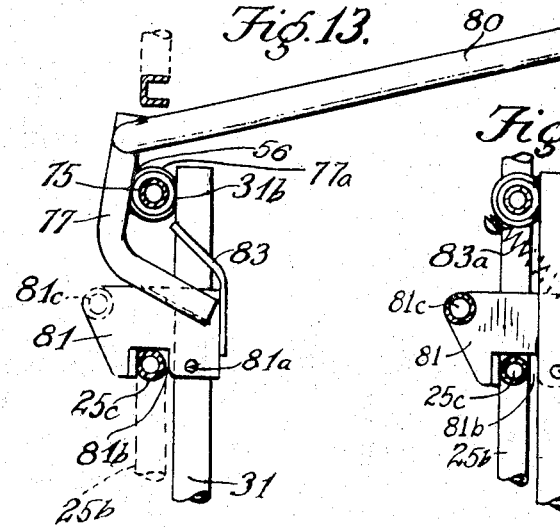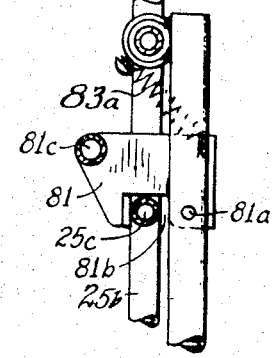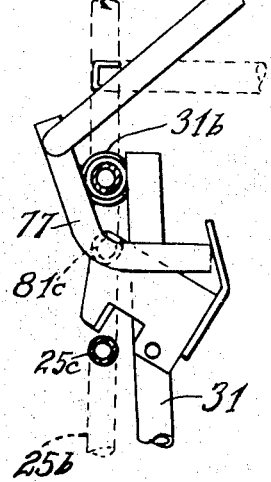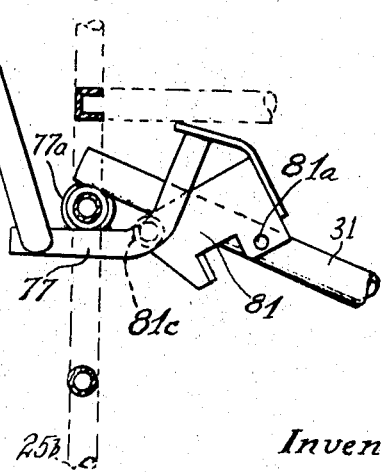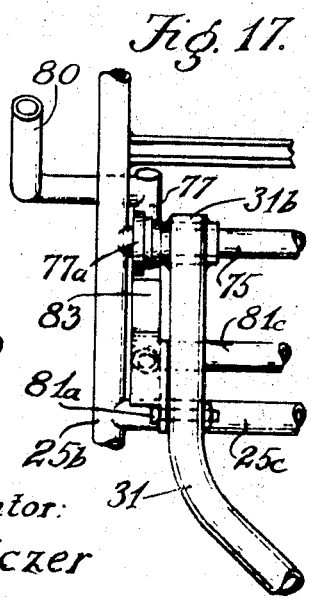

Inventor:
Max Wiczer
By S.J. Lehrer
Attorney.

JOINT SIDE WHEEL AND REAR LEG CONTROL MEANS FOR HAND-PROPELLED CARTS

This application is a continuation-in-part of my pending application on Merchandise Cart filed on Sept. 1, 1970 under Ser. No. 68,721, now U.S. Pat. No. 3,687,415.

My invention relates to hand-propelled carts for transporting merchandise, and more particularly to carts which have a pair of large wheels on the sides and a caster leg at the rear. In some carts a control is operable to fold the side wheels close underneath the frame of the cart; and another control is then operable to fold the caster leg similarly. One object of the present invention is to provide a control to release the side wheels for return to standing position, and a second control which acts automatically in such event to also drop the caster leg to standing position.

A further object is to include means in the said controls for locking the side wheels and caster leg in the standing position.

Another object is to provide frontal cam means yieldable on impact with a vehicle-carried support in front of the cart, a connection acting in such event to fold the caster leg underneath the frame of the cart.

A still further object is to include a connection inducing the said cam means to mount the vehicle-carried support on a short advance of the cart pursuant to the said impact.

A better understanding of the invention may be gained by reference to the accompanying drawings, in which FIG. 1 is a side elevation of the cart;

FIG. 1a is a view of a right-hand roller support seen from the left-hand end of FIG. 1;

FIG. 2 is a top plan view;

FIG. 3 is a rear end view;

FIG. 4 is a front end view from the line 4—4 of FIG. 1, partly broken away;

FIG. 5 is a view similar to FIG. 1, with the cart in collapsed position;

FIG. 6 is an enlargement of a detail in the center of FIG. 1;

FIG. 7 is a duplicate of FIG. 6, showing a change of position;

FIG. 8 is an enlarged duplication of the right-hand upper portion of FIG. 1;

FIG. 9 is a duplicate of a mechanism in the lower central portion of FIG. 1, viewed from the opposite side and partly in perspective;

FIG. 10 is an enlargement of the right-hand bottom portion of FIG. 8, partly in section;

Figure 18:
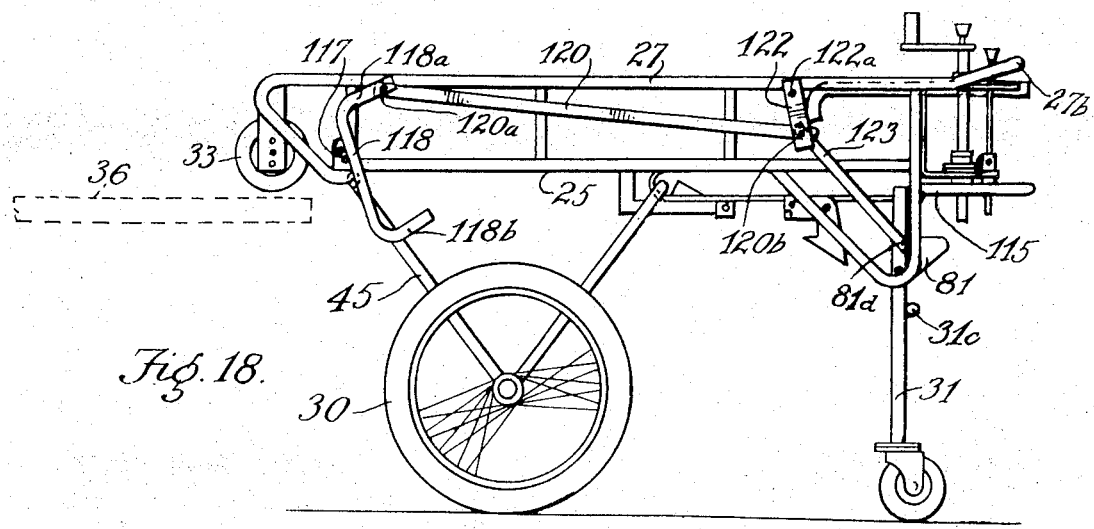
Figure 19:
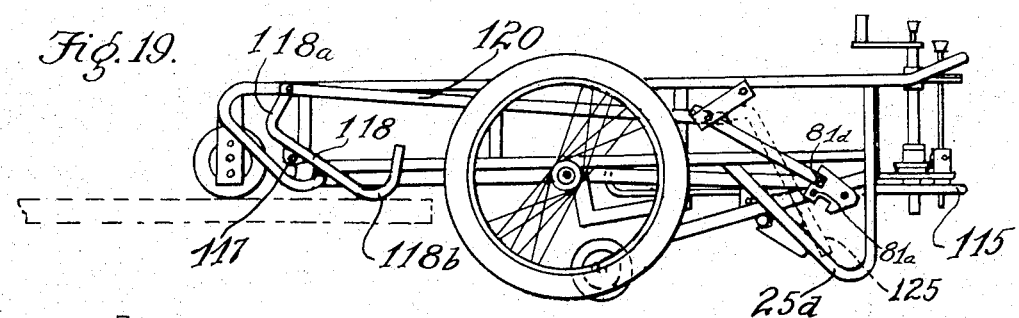
Figures 20, 21, 22:
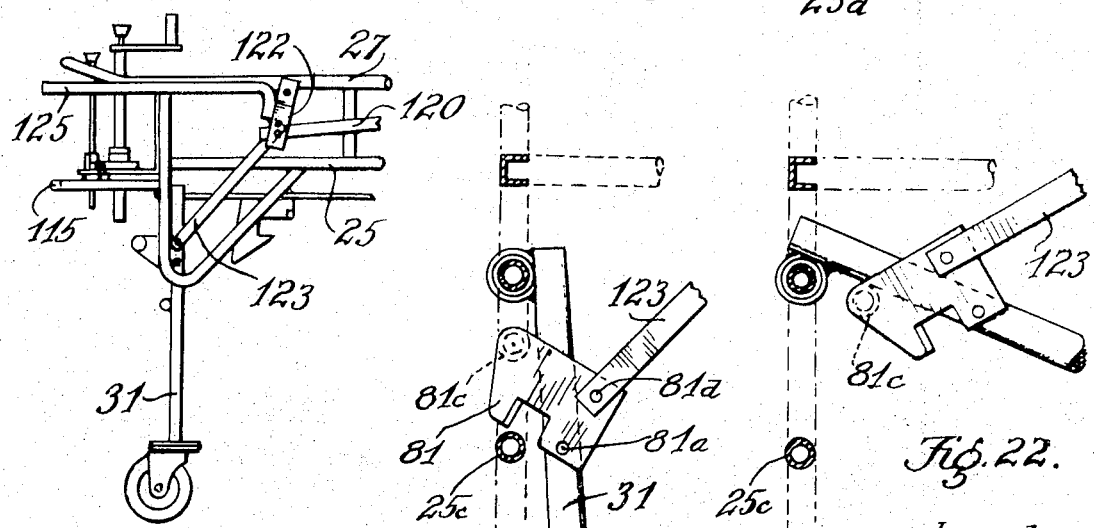

FIGS. 11 and 12 are, respectively, enlarged sections on the lines 11—11 and 12—12 of FIG. 8;

FIG. 13 is an enlarged detail, viewed from the line 13—13 of FIG. 3;

FIG. 14 is an enlarged section on the line 14—14 of FIG. 3;

FIGS. 15 and 16 are duplications of FIG. 13, showing changes of position;

FIG. 17 is an enlarged section on the line 17—17 of FIG. 2;

FIG. 18 is a view similar to FIG. 1, showing a modification;

FIG. 19 is a view similar to FIG. 5, showing a change of position;

FIG. 20 is a duplication of the right-hand portion of FIG. 18 as seen from the opposite side; and FIGS. 21 and 22 are enlargements of the center portion of FIG. 20 showing changes of position.

Referring specifically to the drawings, 25 denotes the horizontal frame of the cart, which is of open construction with internal spacers 25a, as shown in FIG. 2. The frame has a series of side posts 25b which support guard rails 27. These terminate with a cross-bar 27b at the rear, which is used as a handle to propel the cart. In front the side rails curve downwardly to form inclined return bends 27c. The cart has a pair of large side wheels 30 forwardly of the center, a central leg 31 at the rear carrying a caster wheel 31a — as seen in FIGS. 1 and 3 — and a pair of rollers 33 forwardly of the frame 25.

The cart is in the standing position of FIG. 1 for propulsion at floor or street level; and the frame 25 is covered with a board or stiff sheet 35 to accommodate a load of units for filling commodity-vending machines, or merchandise in package form. Since the main object of the invention is to facilitate the raising of the cart into a vehicle, it is in the understanding that a suitable vehicle (not shown) has a tail gate or a rearward platform 36 indicated by dotted lines in the left-hand portion of FIG. 1. The front end of the cart is adaptable to such a platform by means of the rollers 33 which are carried by a cross-shaft 41. Since the level of the platform 36 may vary in different vehicles, the cross-shaft is adjustable to three levels in relation to a pair of side plates 38 carried by the bends 27c. Thus, these have three sets of perforations 38a; and the ends of the cross-shaft pass through the selected set to receive cotter pins 38b. Thus, where a cart is served by one vehicle, the proper height-adjustment of the rollers 33 is permanent; and the height is such — as seen in FIG. 1 — that a forward push of the cart will mount the rollers on the platform 36 and give the forepart of the cart a slight lift.

The forepart of the cart is supported in the normal or standing position by the wheels 30. However, these are carried on an axle 30a by a hanger 45 pivoted to the cart frame at 45a to fold in rearward direction, so that the wheels 30 will be raised to receive the cart frame between them and the axle 30a next underneath, as shown in FIG. 5.

When the cart is in the standing position the side wheels 30 are locked in place; and a control is operable, after the cart frame has gained a frontal support on the vehicle platform by means of the rollers 33 as previously explained, to unlock the wheels and raise them as explained in the foregoing section. The control primarily involves an arched hanger 50 — see FIGS. 1 and 4 — with spread arms 50a pivoted on the wheel axle 30a. The hanger rises with a rearward slant to terminate with its crown, which is seen in cross-section in the left-center of FIG. 6. The crown is in the front end of a looped guide 52 formed with a longitudinally extending bottom slot 52a more clearly seen in FIG. 7. A detent 54 is pivoted at the rear to a pendent lug 52b of the guide 52, and carries a dog 55 which blocks the hanger crown 50 from rearward movement in the guide 52. The detent is supported in the horizontal position of FIG. 6 by a draw-spring 57 connected to the cart frame.

The mechanism just described locks the side wheels from collapsing and keeps the cart in the standing position of FIG. 1. When it is desired to fold the wheels, a mechanism is employed which originates with a crank handle 60 seen at the upper right in FIGS. 1 and 8, the crank handle being carried by the upper end of a hub 62. The cart frame has a bracket 63 at the rear, such bracket having rearwardly directed arms 63a. The hub 62 is enlarged at 62a to rest on the upper bracket arm 63a, and continues as a tube 62b below such arm. The tube carries a hub 62c with a ratchet wheel 65 at the upper end, and a collar 62d at the lower one, the collar and hub being secured to the tube by set screws 62e; and the upper bracket arm has a pawl 66 designed to allow the crank handle to be turned only in one direction. Over the lower bracket arm 63a the tube 62b carries a horizontal pulley 68 (see FIG. 10) formed with a pendent hub 68a and freely rotatable on the tube 62b; and the hub 68a has alined transverse notches 68b in its lower end. The tube 62b has vertical slots 62f behind the notches 68b. A vertical plunger 70 is slidable in the tube 62b, and has a knob 70a at the upper end. The lower end of the plunger has a cross-pin 70b passing through the tube slots 62f into the pulley hub notches 68b; and a compression spring 72 is lodged between the lower end of the plunger 70 and a cross-pin 62g in the bottom of the tube 62b. Thus, the cross-pin 70b locks the pulley 68 to the tube 62b and crank handle 60. A cable 73 is attached to the pulley, and extends in forward direction over a pulley 74 carried by the detent 54 and down as seen at 73a in FIGS. 4 and 6 to make a tied connection 73b with the wheel axle 30a. While the wheels are still locked by the dog 55, the mechanism just described is operable to withdraw the dog and pull the wheels 30 up to folded position when the crank handle is rotated. FIG. 7 shows that the initial tension exerted on the cable 73 depresses the detent 54 to first lower the dog 55 past the hanger crown 50, so that the latter is free to travel in the guide 52 in the direction of the arrow seen in the same figure and permit the wheels to fold.

While the side wheels 30 were raised to the collapsed position shown in FIG. 5, as just described, the cart was supported in front by the vehicle platform and at the rear by the vertical rear leg 31 and its caster wheel 31a. Now the wheels 30 are just below the level of the platform 36, and a slight forward lift of the cart will roll them into the rear of the vehicle. Further progress of the cart is made possible by raising the caster leg 31 in the direction of the curved arrow line in the lower right-hand portion of FIG. 1 to assume the folded position of FIG. 5. When this has been done, the cart can be rolled into the vehicle resting mainly on the side wheels and on a pair of rear legs 25d depending from the sides of the cart frame as shown in FIG. 5.

The folding action of the caster leg 31 will now be described. FIG. 3 shows that this fork-shaped leg depends from a cross-bar 75 in the upper part of the cart frame. The leg 31 is welded to the top bearings 31b to journal it on the cross-bar, as seen in FIG. 17; and a bearing 77a is mounted next on the cross-bar 75, as seen in the same figure. FIG. 13 shows an angle bar 77 which is welded to the bearing 77a.

FIGS. 2 and 13 show a lever 80 carried by the cart on the right-hand side as viewed from the rear, such lever comprising the control for raising the caster leg 31 as mentioned before. FIG. 13 shows the lever in its initial or low position, and that it is attached to the upper end of the angle bar 77. FIG. 13 also shows the caster leg in the upstanding position, and the right-hand one of a pair of latch plates 81 — as seen from the rear — pivoted to the caster leg at 81a; and the left-hand latch plate is shown in FIG. 14. Each latch plate has a bottom notch 81b straddling a cross-bar 25c of the cart frame and locking the caster leg in place; and the latch plates are connected by a cross-bar 81c at the rear. In front the right-hand latch plate carries a cam 83; and the latch plates are held down in the locking position shown by draw-springs 83a, the one for the left-hand latch plate being shown in FIG. 14. When the caster leg is to be raised the lever 80 is lifted to the position of FIG. 15. This causes the lower end of the angle bar 77 to impinge on the cam 83, rocking the latch plate to clear the frame cross-bar 25c as shown, and unlocking the caster leg from the same. Drawing the lever 80 back further to the position indicated in FIG. 16 shows that the angle bar 77 has swung with the bearing 77a to engage the latch plate cross-bar 81c with the caster leg bars and lift the caster leg to the folded position shown in the same figure. The cart is now fully collapsed, but the caster leg must be locked in the raised position; and a mechanism is employed to automatically lock the caster leg in the folded position. Now the cart is fully collapsed; and a final push from behind will slide its rear side legs 25d into the vehicle and locate the cart fully therein. In case the cart is loaded with merchandise, it may remain so until the vehicle makes a delivery stop, in which event the cart is removed from the vehicle and wheeled to the destination of its delivery.

The mechanism for automatically locking the caster leg 31 in the folded state will now be described. FIG. 9 shows that the guide 52 receives a mounting channel 85 on the under side, the channel extending rearwardly with wings 85a. These carry a pin 86 on which a pendent latch 87 is pivoted to be held with its forward portion against the head of the channel 85 as indicated by the section in the upper center of FIG. 9; and a spring 88 extends from a latch pin 90 to a pin 91 on the guide 52. The lower part of the latch has a frontal cam 93 leading into a pocket 94. FIG. 3 shows that the caster leg 31 has a cross-bar 31c in the upper part. Thus, when the caster leg is folded as previously described, the cross-bar 31c rises and crowds the cam 93 in rearward direction, drawing on the spring 88 until the cross-bar falls into the pocket 94; and the pull of the spring 88 keeps the latch in engagement with the cross-bar. It should be noted that the rearward travel of the cam 93 procures the clockwise swing of the latch 87 as seen in FIG. 9 and the rise of the cam hump between the channel wings 85a and through the slot 52a of the guide 52 as suggested by dotted lines in the lower center of FIG. 8.

When the cart is to be backed out of the vehicle for removal, the first step is to give it standing support at the rear, which of course means to lower the caster leg 31. Since the same is freely pivoted, it is free to drop by gravity, after it has been backed clear of the vehicle platform, when the cross-bar 31c is released from the latch pocket 94. The mechanism to do this is shown in FIGS. 8, 10, 11 and 12. The frame rails 27 also journal a vertically-positioned back plunger 100 formed with a knob 100a at the top. FIG. 12 shows that this plunger is located alongside a standard 102 in which a pulley 102a is freely journaled at 102b. A cable 103 is trained over the pulley to descend at the rear into a clamp 105 carried by the plunger 100 below the bracket arm 63a, so that such end becomes tied to the plunger. FIG. 8 shows that the cable is trained forwardly over the pulley to extend to the latch 87 and make a tying connection with the same through a perforation 87a. It is now apparent that depressing the plunger knob 100a will draw on the cable 103 and latch 87 to allow the caster leg 31 to drop to the standing position. As the caster leg swings down to the position shown in FIG. 16, its side bars engage the cross-bar 81c and cause the latch plates 81 to be carried to the position seen in FIG. 15. Since the springs 83a draw on the latch plates to turn them counter-clockwise on their pivots 81a, this will deposit the latch plates as in FIG. 13, where they will lock the caster leg to the adjacent vertical frame post 25b.

When the cart has gained a rear support on the ground or other surface behind the vehicle, the side wheels must be dropped to standing position in order to secure a further support for the cart in the region behind the vehicle. It will now be recalled that during the wheel-folding action the wheel hanger 50 moved in rearward direction from the position of FIG. 1 to that of FIG. 5, that is, to the rear portion of the guide 52. Since the wheel lifting was done by means of the crank handle and the ratchet 65 as previously explained, the self-locking operation of the ratchet served to maintain the wheels in the folded position. However, the wheels are freely pivoted, and can drop by gravity once the pulley 68 is disconnected from the crank handle tube 62b. Thus, when the knob 70a is depressed, the cross-pins 70b of the tube (see FIGS. 8 and 10) drop out of the notches 68b in the pulley hub 68a. The pulley is now free to turn as the weight of the wheel assembly draws on the cable 73. The wheels now drop to the ground, and become locked in standing position by the tripping of the hanger crown 50 over the dog 55 from the position of FIG. 7 to that of FIG. 6.

It has been stated that the first concern on the withdrawal of the cart from the vehicle is to give it a rear support by dropping the caster leg 31. However, where the folded wheels are out of the vehicle, the mechanism to drop them is augmented to automatically drop the caster leg 31 at the same time by simply pressing the crank handle knob 70a, and without the need of pressing the back knob 100a. The added mechanism for this purpose — illustrated in FIG. 9 — employs a dog 110 which is pivoted at 110a to the front end of the latch 87. Such end has a backstop 87b for a side wing 110b extending from the dog 110; and the side wing is kept against the backstop by a spring 112 leading from the side pin 90 of the latch 87. When the cart wheels are swung to folded position, the crown of the hanger 50 slides to the rear of the guide 52, tripping the dog 110 without incident. However, when the knob 70a is depressed to drop the wheels, the return of the hanger crown 50 in forward direction causes it to meet and impinge on the dog 110, that is, toward the right as seen in FIG. 9. The dog therefore rotates in clockwise direction on its pivot 110a, and causes its side wing 110b to impinge rearwardly on the latch backstop 87b. The latch 87 therefore swings on its pivot and departs from the caster leg bar 31c, allowing the caster leg to drop to standing position and become locked therein as explained before. Welds 56 are shown in FIGS. 6, 8 and 13 for joined parts, and may also be used elsewhere when advisable.

FIGS. 18 to 22 show a modification which folds the caster leg 31 automatically as the cart is advanced to mount the vehicle platform 36. One addition for this purpose is a handle 115 similar to the main handle 27b and extended from the rear of the frame at a lower level, as seen in FIG. 18. The modification originates with companion frontal bearing blocks 117 attached to the cart frame 25 for pivoting a pair of cams 118 along the sides of the frame. Each cam has a rearward bend 118a at the top and a curved rearward bend 118b at the bottom. A long rearward bar 120 is pivoted with its front end to each cam bend 118a as indicated at 120a, while the rear end of each bar 120 is pivoted at 120b to the lower end of a short link 122; and the upper end of the latter is pivoted at 122a to the related top rail 27 of the frame 25. The bottom of each link is also connected on the pivot 120b to a rearwardly inclined arm 123 whose lower end makes a pivotal connection with a stud 81d above the pivot 81a of the related latch plate 81, as shown in FIG. 21.

FIG. 18 shows the first advance of the cart to mount the frontal rollers 33 on the vehicle platform 36. Before the next advance, the side wheels are raised by rotating the crank handle 60 as previously described, while the cart is sustained by the vehicle platform in front and by the standing caster leg 31 at the rear. The next operation is to slightly lift the rear of the cart by means of the lower handle 115, and urge the cart in forward direction. This movement is made easier by the advance of the frontal rollers 33 on the platform until the curved lower bends 118b of the frontal cams 118 meet the edge of the platform, and the cams are swung on their pivots 117 in counterclockwise direction. This action draws forwardly on the side bars 120, and also on the links 122 to swing these forwardly on their pivots 122a. This causes the links to draw on the inclined arms 123 with the effect of turning the latch plates 81 from the position locking the caster leg 31 to the frame bar 25c — as seen in FIG. 13 — to a position free of that bar, as seen in FIGS. 19 and 21. Another forward push of the cart will induce the further rotation of the cams 118 to fully mount them on the vehicle platform as seen in FIG. 19. The effect of this movement will be to draw on the latch plates 81 until their cross-bar 81c bears on the caster leg 31 and raises it from the pendent position of FIG. 21 to the folded one shown in FIG. 22. The caster leg now remains locked in folded position by tripping the latch 87 as previously explained.

When the cart as modified is to be withdrawn from the vehicle, the means to drop the side wheels to standing position remain as before. However, the cart must first be drawn back to a point where the cams 118 will clear the end of the platform 36 and return to their initial position as the caster leg is dropped to support the cart at the rear. It is noted that a hand lever 125 is attached to the right-hand link 122 (as seen from the rear) and clearly shown in FIG. 20, the hand lever being depressible to the dotted-line position shown in FIG. 19 in order to operate the links in case it is desired to fold the caster leg manually.

It is now apparent that the novel merchandise cart employs a number of techniques designed to eliminate strain in the manual propulsion of the cart into or out of a vehicle body. In other words, an initial support is secured by mounting the front rollers on the platform of the vehicle. Next, the relatively heavy side wheel assembly is raised with a gain of leverage by the winch-line mechanism of the crank handle 60 and pulley 68; and the lighter caster leg is folded with little effort by raising the lever 80. Further, the use of the rearmost control — the plunger knob 100a — is optional, and only desirable when the side wheels are not in the clear to be dropped. The principle of the cart therefore makes it easy for one person to handle it; and its mechanism and controls are of a simple and sturdy nature.

I claim:

1. The combination with a cart frame, side wheels for the same, a support for the side wheels pivoted to the frame for folding the support in an upward direction, a guide carried by the frame, and a rigid hanger pivotally connected at one end of the frame to said support with the other end of the hanger slidably engaged in said guide; of means for folding the side wheels, said means being self-locking to maintain the wheels in the folded position, means to release the self-locking means and allow the wheels to drop to the original position; an upstanding leg pivoted from one end of the frame to fold under the frame; a latch retaining the leg in the folded position; and a rotatable member pivoted on said guide and disposed to impinge against the latch during the wheel dropping movement to withdraw the latch and release the leg to unfold by gravity to the standing position.

2. The structure of claim 1, said connection comprising a dog pivoted in the guide and tripped by the hanger on the wheel-folding movement, the return of the hanger on the wheel-dropping movement rotating the dog to impinge on the latch to cause the latch to withdraw as stated.

3. The combination with a cart frame, side wheels for the latter, and means carrying the wheels and pivoted to the frame for folding them toward its under side for mounting a vehicle ahead of the cart; of an upstanding leg pivoted at one end of the frame to fold under the same, pivoted latch means normally locking the leg in the standing position, frontal cams means pivotally mounted to the other end portion of the frame and pivotable by impact with the vehicle on the advance of the cart, and pivoted connection means interconnecting the cam means and the latch, said pivoted connection means operated by the pivotal movement of the cams to release said latch and fold the leg as stated.

4. The structure of claim 3, the frame having a cross-member and the latch means recessed to receive the same and normally lock the leg as stated, and said pivoted connection means first swinging the latch means upwardly to release the cross-member and further to fold the leg as stated.

5. The structure of claim 3, said pivoted connection means comprising side bars extending rearwardly from the cam means, links pivoted to the cart frame and swung in upward direction by the side bars on the backing of the cam means, and arms from the links to the latch means and effective in such event to swing the latch means upwardly and fold the leg as stated.

6. The structure of claim 5, and a hand lever carried by one of said links to swing them as stated when the manual folding of the leg is desired.

7. The structure of claim 3, said cam means pivoted horizontally to the cart frame to present a lower portion to said backing impact and rotate with an upper portion in vehicle-mounting direction, and said pivoted connection means extending from the upper portion of the cam means to the latch means, the further advance of the cart fully mounting the cam means on the vehicle.

* * * * *